United States Patent [19]

Taniguchi et al.

[11] Patent Number: 5,437,918
[45] Date of Patent: Aug. 1, 1995

[54] DEGRADABLE NON-WOVEN FABRIC AND PREPARATION PROCESS THEREOF

[75] Inventors: Keiko Taniguchi, Gifu; Masahiro Washino, Aichi; Shinobu Moriya, Aichi; Hosei Shinoda, Aichi; Masami Ohtaguro, Aichi; Akihiro Funae, Aichi; Shigeru Iimuro, Aichi, all of Japan

[73] Assignee: Mitsui Toatsu Chemicals, Inc., Tokyo, Japan

[21] Appl. No.: 145,621

[22] Filed: Nov. 4, 1993

[30] Foreign Application Priority Data

Nov. 11, 1992 [JP] Japan .................. 4-301192
Jun. 4, 1993 [JP] Japan .................. 5-134425

[51] Int. Cl.⁶ .................. B32B 1/02; B32B 1/08; B32B 1/10; B32B 27/02
[52] U.S. Cl. .................. 428/224; 428/227; 428/229; 428/255; 428/287; 428/288; 428/480; 264/103; 264/257; 264/258; 264/319; 264/331.21; 264/546
[58] Field of Search .............. 428/287, 480, 224, 227, 428/234, 255, 288; 264/103, 257, 258, 319, 331.21, 546

[56] References Cited

U.S. PATENT DOCUMENTS

| | | | |
|---|---|---|---|
| 4,045,418 | 8/1977 | Sinclair | 260/78.3 R |
| 5,294,469 | 3/1994 | Suzuki et al. | 428/36.1 |

FOREIGN PATENT DOCUMENTS

| | | |
|---|---|---|
| 507554 | 10/1992 | European Pat. Off. . |
| 510998 | 10/1992 | European Pat. Off. . |
| 510999 | 10/1992 | European Pat. Off. . |
| 530987 | 3/1993 | European Pat. Off. . |
| 41-2734 | 2/1941 | Japan . |
| 50-146182 | 11/1975 | Japan . |
| 59-88961 | 5/1984 | Japan . |
| 59-94660 | 5/1984 | Japan . |
| 63-95041 | 4/1988 | Japan . |

OTHER PUBLICATIONS

Derwent Abstracts 93-102698: "Soft Biodegradable Nonwovens", Esaki et al.
Derwent Abstracts 91-354911: "Nonwoven Fabric Composite for Hygiene Articles", Utz et al.

*Primary Examiner*—Frederick Krass
*Attorney, Agent, or Firm*—Burns, Doane, Swecker & Mathis

[57] ABSTRACT

A degradable non-woven fabric obtained from an web formed of lactic acid-based polymer filaments comprising of one or more lactic acid-based polymers selected from a poly (DL-lactic acid) having more than 80 mol % of L-lactic acid units, poly (DL-lactic acid) having more than 80 mol % of D-lactic acid units, L-lactic acid/hydroxycarboxylic acid copolymer having 70 mol % or more of L-lactic acid units, and D-lactic acid/hydroxycarboxylic acid copolymer having 70 mol % or more of D-lactic acid units, and a preparation process of the degradable non-woven fabric which has good dimensional stability and can be degraded and disappeared under natural environment when abandoned.

22 Claims, No Drawings

DEGRADABLE NON-WOVEN FABRIC AND PREPARATION PROCESS THEREOF

BACKGROUND OF THE INVENTION AND RELATED ART

1. Field of the Invention

The present invention relates to a non-woven fabric and a preparation process thereof, and more particularly relates to a non-woven fabric which is obtained by bonding or intertwining a web of filaments comprising a lactic acid-based polymer having a specific composition and having excellent dimensional stability, and a preparation process of the non-woven fabric.

2. Related Art of the Invention

Non-woven fabrics are cloth like materials prepared without weaving or knitting. More particularly, non-woven fabrics are cloth-like materials prepared from webs, which are made by bulk phase fibrous materials and not yet bonded or,intertwined, by bonding or intertwining constituent filaments of the web and obtained without weaving or knitting.

Conventionally, non-woven fabrics have widely used for garment inner lining, carpets and other materials industry. Filament materials which have been used for constituting non-woven fabrics are polyethylene, polypropylene and other polyolefins; polyethylene terephthalate (PET), polybutylene terephthalate and other aromatic polyesters; nylon-6, nylon-66, nylon-610 and other polyamides; and rayons and other cellulosics. Non-woven fabrics prepared from these polymers and preparation processes for these fabrics are disclosed, for example, in Japanese Laid-Open Patent SHO 59-88961 and 59-94660.

These filament materials, however, are almost non-degradable in the natural environment or have a very low rate of degradation. Consequently, conventional non-woven fabrics prepared from these materials remain semipermanently in the soil when buried after use. When abandoned in an ocean, these filament materials impair scenery or destruct the living environment of marine organisms. Thus, disposal of these waste materials has caused serious social problems.

Alternatively, when these materials are disposed by incineration, the global environment is destructed by evolution of toxic gases and action of these gases for accelerating corrosion of incinerators also leads to problems.

On the other hand, non-woven fabrics have been developed by using filament materials which are prepared from polymers having bioabsorbability and hydrolyzability.

For example, Japanese Laid-Open Patent SHO 63-95041 discloses a process for preparing multifilaments by melt-spinning (or melt-extruding) bio-absorbable polymers such as polyglycolic acid and a glycolic acid/lactic acid copolymer, converting the multifilaments to a random web, preparing a non-woven fabric from the random web and using the non-woven fabric as a raw material of medical pledget.

In the preparation example of said non-woven fabric, polyglycolic acid chips that one used have a reduced viscosity ($\eta$sp/C) of 1.5 which is measured at 30° C as a solution in a solvent mixture composed of 10 parts of phenol and 7 parts of trichlorophenol. In the disclosed process, the chips were melt-spun at 245° C., stretched into filaments having 35 deniers per 12 filaments, heat-treated at 108° C. for 3 hours, fabricated into a tubular knit with a cylindrical knitting machine, and needle punched after superimposing the resultant four knits to obtain a non-woven fabric having scarcely distinguishable stitches.

One of the most common processes presently used for manufacturing non-fabrics is a so-called spin bonding process. In the process, a polymer is melt-extruded to form filaments, the filaments are directly captured on a screen belt and converted to webs, and the webs are hot pressed with a heat embossing roll to obtain a non-woven fabric.

The following problems are encountered in the case of manufacturing non-woven fabrics in a large amount from polyglycolic acid by the spin bonding process. That is, polyglycolic acid filaments which are melt-extruded from an extruder are in an amorphous state having almost no crystalline portion. Sufficient crystallization cannot be progressed merely by capturing on a screen belt, converting to webs, and pressing with a hot embossing roll. Further, crystallization of the polyglycolic acid filaments gradually progresses even at room temperature when allowed to stand for a long period in an amorphous state. Consequently, non-woven fabrics prepared from polyglycolic acid filaments by the spin bonding process leads to problems such as development of shrinking and wrinkles due to crystallization of polyglycolic acid during storage or in use. Further, polyglycolic acid has high rigidity and thus non-woven fabrics prepared from polyglycolic acid does not always have high flexibility and are restricted in use.

Polylactic acid is also used for degradable polymers similar to polyglycolic acid. Non-woven fabrics prepared from polylactic acid have improved flexibility as compared with those prepared from polyglycolic acid. However, non-woven fabrics of polylactic acid also cause shrinking and wrinkles and lead to problems due to poor dimensional stability.

Degradable surgical filaments prepared from polylactic acid have been known. For example, Japanese Patent Publication SHO 41-2734 discloses an absorbable surgical filament consisting of a lactic acid polymer which has an inherent viscosity of 1.0 or more at 25° C. in a 0.1 wt % benzene solution and has a monofilament shrinkage of 15% or less after immersing in water at 77° C. for 5 minutes. In practice, poly(L-lactic acid) or poly(D-lactic acid) having the above inherent viscosity is melt-spun and heat-treated under tension at 60°~150° for 0.5~5 minutes and successively cooled under tension to room temperature. The filament thus obtained is described as having an excellent tensile strength and low shrinkage and as being suitable for surgical sutures.

Poly(L-lactic acid) and poly(D-lactic acid) have high crystallinity and thus heat treatment is required in order to improve dimensional stability and tensile strength of the filaments obtained from these polymers.

On the other hand, non-woven fabrics do not require extremely high tensile strength and rather require excellent dimensional stability. When the non-woven fabrics obtained from poly(L-lactic acid) or poly(D-lactic acid) are heat-treated in order to improve dimensional stability, the filaments are not heated under one-dimensional tension as disclosed in Japanese Patent Publication SHO 41-2734, but must be heat-treated under two-dimensional uniform tension. As a result, the step becomes complex and must be unfavorably carried out in a large scale. Even if the non-woven fabrics are heat-treated under such technically complex conditions, problems of developing shrinking and wrinkles are inevitable and breakage of the non-woven fabric unfavorably takes place in some cases.

Further, poly(L-lactic acid) and poly(D-lactic acid) have high crystallinity and are thus difficult to provide molded articles with flexibility by addition of plasticizers.

SUMMARY OF THE INVENTION

One object of the invention is to provide a non-woven fabric which can be degraded and disappeared under natural environment when abandoned after use for a prescribed period and a preparation process of the non-woven fabric.

Another object of the invention is to provide a non-woven fabric which has good dimensional stability and develops no shrinking, wrinkles or other deformation and a process for preparing the non-woven fabric.

That is, one aspect of the invention is a degradable non-woven fabric obtained from a web of filaments composed of a lactic acid-base polymer comprising one or more polymers (polymer A) selected from a poly(DL-lactic acid) having more than 80 mol % of L-lactic acid units, poly(DL-lactic acid) having more than 80 mol % of D-lactic acid units, L-lactic acid/hydroxycarboxylic acid copolymer having 70 mol % or more of L-lactic acid units, and B-lactic acid/hydroxycarboxylic acid copolymer having 70 mol % or more of D-lactic acid units, and a process for preparing the degradable non-woven fabric.

Another aspect of the invention is a degradable non-woven fabric obtained from a web of lactic acid-based polymer filaments comprising a filament mixture of the filaments composed of the above polymer A and filaments composed of a low temperature thermoplastic lactic acid base polymer comprising one or more polymers (polymer B) selected from a poly(DL-lactic acid) filament having 1:4~4:1 in the mol ratio of L-lactic acid units to D-lactic acid units, DL-lactic acid/hydroxycarboxylic acid copolymer filament, L-lactic acid/hydroxycarboxylic acid copolymer filament having 30 mol % or more of hydroxycarboxylic acid units, and D-lactic acid/hydroxycarboxylic acid copolymer filament having 30 mol % or more of hydroxycarboxylic acid units, and a process for preparing the degradable non-woven fabric.

Exemplary hydroxycarboxylic acid includes glycolic acid, hydroxybutyric acid, hydroxyvaleric acid, hydroxypentanoic acid, hydroxycaproic acid and hydroxyheptanoic acid. Glycolic acid and hydroxycaproic acid are preferred.

The degradable non-woven fabric of the invention can be obtained by spinning the lactic acid-base polymer having a specific composition, successively forming the web and bonding or intertwining the web through, for example, thermal bonding, needle punching, stitch bonding, jet bonding or resin bonding. Thermal bonding is preferred.

The degradable non-woven fabric prepared from the web composed of the lactic acid-based polymer having the specific composition of the invention can maintain a certain shape of the non-woven fabric for a prescribed period, has an excellent dimensional stability and is degraded under natural environment when abandoned after use. Consequently, the non-woven fabric of the invention does not accumulate as a waste.

DETAILED DESCRIPTION OF PREFERRED EMBODIMENTS

The present invention will hereinafter be illustrated in detail.

The molecular weight of the polymer in the invention is referred to the weight average molecular weight unless otherwise noted.

The lactic acid-based polymer which can be used as a filament material of the invention is poly(DL-lactic acid) having a specific amount of L-lactic acid units and D-lactic acid units as recurring units in the molecular structure, or a lactic acid/hydroxycarboxylic acid copolymer having a specific amount of lactic acid units and other hydroxycarboxylic acid units as recurring units in the molecular structure. Poly(DL-lactic acid) which can be used as a filament material in the invention is polylactic acid having L-lactic acid units and D-lactic acid units as recurring units in the molecular structure and differs in structure from poly(L-lactic acid) consisting of L-lactic acid units alone or poly(D-lactic acid) consisting of D-lactic acid units alone.

Exemplary polylactic acid includes poly(DL-lactic acid) having more than 80 mol % of L-lactic acid units, poly(DL-lactic acid) having more than 80 mol % of D-lactic acid units, and a mixture of these polylactic acids. Exemplary copolymers of lactic acid and other hydroxycarboxylic acid include an L-lactic acid/hydroxycarboxylic acid copolymer having 70 mol % or more of L-lactic acid units, D-lactic acid/hydroxycarboxylic acid copolymer having 70 mol% or more of L-lactic acid units, D-lactic acid/hydroxycarboxylic acid copolymer having 70 mol % or more of D-lactic acid units, and a mixture of these copolymers.

The lactic acid-based polymers having the above compositions have lower crystallinity and a 10°~15° C. higher transition temperature from amorphous to crystalline state as compared with poly(L-lactic acid) consisting of L-lactic acid units alone and poly(D-lactic acid) consisting of D-lactic acid units alone. Consequently, the non-woven fabric prepared by melt-spinning the above lactic acid-based polymers can maintain initial dimensions for a long period without particularly complex operations such as heat treatment and annealing and does not deform by generating shrinking and wrinkles. However, additional heat treatment can provide crystallinity to a suitable extent and can enhance strength of the non-woven fabric while restricting the development of shrinking and wrinkles to a minimum. The lactic acid-based polymer having the above composition can be readily plasticized with a plasticizer and thus a non-woven fabric having high flexibility can be obtained with ease. Further, these polymers have a melting point and thus the filament of these polymers can be fused to each other by hot compression. Such property is suited for the material of non-woven fabric.

The lactic acid-based polymer of the invention can be prepared by dehydrating polycondensation of L-lactic acid and D-lactic acid or DL-lactic acid, dehydrating copolycondensation of L-lactic acid, D-lactic acid or DL-lactic acid with other hydroxycarboxylic acid or ring-opening copolymerization of cyclic dimers of lactic acid such as L-lactide, D-lactide, or DL-lactide with cyclic monomers or dimers of other hydroxycarboxylic acids.

On carrying out the dehydrating polycondensation, the above lactic acid or the above lactic acid and other hydroxycarboxylic acid are azeotropically dehydrated preferably in the presence of an organic solvent, a phenyl ether base solvent in particular. The polycondensation is most preferably carried out by removing water from the azeotropically distilled solvent and returning the substantially anhydrous solvent to the reaction system.

Exemplary hydroxycarboxylic acids which can be used as a comonomer of the above lactic acid/hydroxycarboxylic acid copolymer includes glycolic acid, hydroxybutyric acid, hydroxyvaleric acid, hydroxypentanoic acid, hydroxycaproic acid and hydroxyheptanoic acid. Preferred comonomers are glycolic acid and hydroxycaproic acid. As a decrease of crystallinity to some extent is preferable, poly(DL-lactic acid) is prepared by mixing L-lactic acid with D-lactic acid in a specific ratio, using DL-lactic acid, or mixing L-lactic acid and/or D-lactic acid with DL-lactic acid in a specific ratio.

Ring-opening polymerization is carried out by using L-lactide which is a cyclic dimer of L-lactic acid, D-lactide which is a cyclic dimer of D-lactic acid, DL-lactide which is an equimolar mixture of L-lactide and D-lactide, meso-lactide which is a cyclic dimer of DL-lactic acid, or a mixture of these lactides and a cyclic ester of another hydroxycarboxylic acid. Exemplary cyclic esters of other hydroxycarboxylic acids include glycolide which is a diner of glycolic acid, β-propiolactone, β-butyrolactone, δ-valerolactone and ε-caprolactone. Glycolide and ε-caprolactone are preferred. Poly(DL-lactic acid) is prepared by mixing L-lactide with D-lactide in a specific ratio, using DL-lactide, or mixing L-lactide and/or D-lactide with DL-lactide in a specific ratio.

In any polymerization process, monomer composition used is almost equal to the composition of polymer in order to obtain the lactic acid-based polymer having the above composition. For example, poly(DL-lactic acid) having 80 mol % of L-lactic acid unit can be prepared by carrying out dehydrating polycondensation using a monomer mixture of 80 mol % of L-lactic acid and 20 mol % of D-lactic acid, or using a monomer mixture of 60 mol % of L-lactic acid and 40 mol % of DL-lactic acid (D/L=50/50)

A similar polymer can be obtained by carrying out ring-opening polymerization using L-lactide in place of L-lactic acid, D-lactide in place of D-lactic acid, and DL-lactide in place of DL-lactic acid, respectively. A L-lactic acid/glycolic acid copolymer having 70 mol % of L-lactic acid unit can be prepared by carrying out dehydrating polycondensation using a monomer mixture composed of 70 mol % of L-lactic acid and 30 mol % of glycolic acid. A similar polymer can be obtained by carrying out ring-opening polymerization using L-lactide in place of L-lactic acid and glycolide in place of glycolic acid, respectively.

Poly(L-lactic acid) having 100 mol % of L-lactic acid unit and poly(D-lactic acid) having 100 mol % of D-lactic acid unit have a melting point of about 180° C. and have a transition temperature (Tc) from an amorphous state to a crystalline state of about 90° C.

As for poly(DL-lactic acid) obtained by the above ring opening polymerization, the melting point decreases in the range of about 3~5° C./% unit content and Tc increases in the range of 1~3° C./% unit content accompanied by 0 to 20% increase in the L-lactic acid unit or D-lactic acid unit. Surprisingly, poly(DL-lactic acid) obtained by the above dehydrating polycondensation in particular is 10~20° C. lower in the melting point and 10~15° C. higher in the transition temperature (Tc) from amorphous to crystal region as compared with poly(L-lactic acid) or poly(D-lactic acid), even,though the L-lactic acid unit is only about 1% (D-lactic acid unit is about 99%) or the D-lactic acid unit is only about 1% (L-lactic acid unit is about 99%), and attains to a maximum crystallinity of only 30~40%. On the other hand, poly(L-lactic acid) and poly(D-lactic acid) attain a higher crystallinity of 50~60%. Consequently, non-woven fabric prepared from a poly(DL-lactic acid) filament has good time-dependent dimensional stability without heat treatment. Further, the filament can enhance its strength by heat treatment and is thus suited for use in the preparation of non-woven fabric. Lactic acid based copolymers having the above compositions are the same as above.

The proportion of the L-lactic acid unit to the D-lactic acid unit in poly(DL-lactic acid) can be determined, for example, with a method using an enzyme. That is, poly(DL-lactic acid) s hydrolyzed by an aqueous alkali solution, and L-lactic acid in the resulting solution is successively subjected to the action of L-lactic acid dehydrogenase and nicotinamide adenine dinucleotide (hereinafter referred to as NAP). NADH which is a reduced form of NAD generated with the oxidation of lactic acid to pyruvic acid. The amount of L-lactic acid is determined by an absorbance analysis of NADH. The amount of D-lactic acid is similarly determined by action of D-lactic acid dehydrogenase and NAP. The ratio of L-lactic acid to D-lactic acid is calculated from these amounts. Additionally, it is confirmed that L-lactic acid itself does not cause racemization during hydrolysis in an aqueous alkali solution. The L-lactic acid unit or D-lactic acid unit in an lactic acid/hydroxycarboxylic acid copolymer can also be determined by the same method as above.

No particular limitation is imposed upon the molecular weight of the lactic acid base polymer used for the degradable non-woven fabric of the invention. When the molecular weight is reduced, spinning becomes difficult or the strength of the resulting filament becomes lower even though spinning is possible. On the other hand, higher molecular weight lowers processing ability and spinning tends to be difficult. In view of these circumstances, molecular weight is preferably in the range of 10,000,~1,000,000, more preferably in the range of 30,000,~500,000.

The lactic acid based polymer which constitutes the degradable non-woven fabric of the invention can be hydrolyzed not only in water or soil, but also by atmospheric moisture. Consequently, hydrolysis is proceeded by atmospheric moisture or rain water even in the period of using the non-woven fabric. The rate of hydrolysis depends upon the molecular weight of polymer and the composition. The optimum molecular weight and the composition of the lactic acid-based polymer which is used for the non-woven fabric of the invention can be determined so as to meet the longest period of use in view of the hydrolysis data on the above range of the lactic acid-based polymer composition.

According to the information of the present inventors, for example, the above poly (D-lactic acid) composition having a molecular weight of 150,000 or more is suited for the filament material when the period of using the non-woven fabric is 6 months or more. When the period is about a month, preferred molecular weight of the above poly (DL-lactic acid) composition is 50,000 or more.

Known spinning processes can be applied to prepare a filament by spinning the raw material. Processes which can be applied are, for example, a melt spinning process which carries out-melt spinning of the lactic acid-based polymer with an extruder, wet spinning process which dissolves the lactic acid-based polymer in a solvent and delivers the resulting solution from a nozzle into a poor solvent, and dry spinning process which delivers the above solution from a nozzle into a dry gas.

Exemplary solvents which can be used for the wet spinning process and dry spinning process include toluene, xylene, chloroform and methylene chloride. Exemplary poor solvents used for the wet spinning process include methanol, hexane and acetone.

Melt spinning process can be carried out with a single screw extruder, twin screw extruder and other known extruders. When the extrusion temperature is low, it is difficult to carry out stable extrusion operation and is liable to cause overload. On the other hand, a high extrusion temperature leads to generation of violent thermal decomposition and results in a molecular weight decrease, reduction of strength and color development. In view of these side effects, the extrusion temperature of the lactic acid-based polymer is preferably in the range of 100°~280° C., more preferably in the range of 130°~250° C. The diameter of the extrusion nozzle is suitably determined in view of the required diameter of the filament, delivery rate of the extruder and take-up speed. The nozzle diameter is preferably 0.1~3.0 mm.

In any spinning process, stretching of a spun filament is not always needed. However, when stretching is carried out, the stretch ratio is usually 1.1~10 times, preferably 2~7 times. Stretching temperature depends upon the lactic acid-based polymer used and is in the range of 60°~210° C. Preferred diameter of the filament is 0.5~40 deniers. Preferred length of the filament is 0.5~30 cm.

A block of filaments called a web is formed from the resulting filaments of the lactic acid-based polymer. The filaments are not yet bonded or intertwined with each other in the state of a web and thus the web is not a non-woven fabric. No particular restriction is placed upon the preparation process of the web. Known processes can be used and include, for example, a curd type process using a flat curd machine, a roller curd machine and a garnett machine; a melt blown process; and a spin bonding process which spins the lactic acid-based polymer while blowing high speed air to the outlet of the spinning nozzle and collects delivered filaments to form a web on a perforated conveyor located perpendicularly to the direction of air flow.

Known processes can be used for preparing the degradable non-woven fabric of the invention from the web of the filaments composed of the lactic acid-based polymer. Known processes include, for example, a needle punching process which intertwines the filaments by needle compression, stitch bonding process which interlocks the filaments with a thread, jet bonding process which interlocks the filaments with a water jet, thermal bonding process which bonds the filaments by heating and resin bonding process which adheres the filaments by use of resin adhesive.

In the present invention, bonding includes bonding, punching, intertwining, interlocking or adhering by force or heat and/or by using of adhesive or thread.

Preferred processes are below described processes (1) and (2). (1) A process for compressing the web of filaments composed of the lactic acid-based polymer (polymer A) in a temperature range of more than 70° C. to less than melting point.

The non-woven fabric obtained by the process has low deformation and shrinkage for a long period without particular heat treatment as mentioned above. However, heat treatment can be carried out in order to enhance the strength of the non-woven fabric. Heat treatment temperature is preferably 80°~140° C. When the temperature is lower than 80° C., sufficient crystallization is difficult to occur and the strength of the non-woven fabric cannot be improved. Treatment temperature exceeding 140° C. leads to softening or fusion of the non-woven fabric and thus deformation and rupture are unfavorably liable to occur. Particularly preferred temperature range is 90°~130° C.

(2) A process for mixing primary web of filaments composed of lactic acid-based polymer (polymer A) with a prescribed proportion of web of filaments composed of a low temperature thermoplastic lactic acid-based polymer (polymer B) which melt or soften at temperature of 70° C. or less and compressing in the range of room temperature to 70° C.

The web of filaments composed of the lactic acid-based polymer which is preferably used for the above process (1) and the primary web of filaments composed of the lactic acid-based polymer which is preferably used for the above process (2) are prepared from filaments composed of one or more degradable lactic acid-based polymers (polymer A) selected from a poly(DL-lactic acid) having more than 80 mol % of L-lactic acid unit or D-lactic acid unit, L-lactic acid/hydroxycarboxylic acid polymer having 70 mol % or more of L-lactic acid unit, and D-lactic acid/hydroxycarboxylic acid copolymer having 70 mol % or more of D-lactic acid unit.

In the above process (2), the primary web of filaments composed of the lactic acid-based polymer used in the process (1) is mixed with the web of filaments composed of a low temperature thermoplastic lactic acid-based polymer (polymer B) which melt or soften at temperature of 70° C. or less (hereinafter referred to as low temperature thermoplastic lactic acid-based polymer), the web of filaments composed of said low temperature thermoplastic lactic acid-based polymer is molten or softened in the temperature range of room temperature to 70° C., and the primary web is adhered each other.

Exemplary preferred webs of filaments composed of the low temperature thermoplastic lactic acid-based polymer which can be used for the process comprises a main component which includes poly(DL-lactic acid) having 1:4~4:1 in the mol ratio of L-lactic acid unit to D-lactic acid unit, DL-lactic acid/hydroxycarboxylic acid copolymer having an arbitrary mol ratio of L-lactic/hydroxycarboxylic acid copolymer having 30 mol % or more of hydroxycarboxylic acid unit, L-lactic acid/hydroxycarboxylic acid unit, and a mixture thereof.

The DL-lactic acid/hydroxycarboxylic acid copolymer and the L- or D-lactic acid/hydroxycarboxylic acid copolymer having 30 mol % or more of hydroxycarboxylic acid unit are preferably copolymers of DL-lactic acid, L-lactic acid or D-lactic acid with glycolic acid or hydroxycaproic acid. The low temperature thermoplastic lactic acid-based polymer which is a material of web of filaments composed of the above low temperature thermoplastic lactic acid-based polymer can be prepared by dehydrating polycondensation or ring-opening polymerization using a monomer composition almost equal to the polymer composition. For example, poly (DL-lactic acid) having L-lactic acid unit and D-lactic acid unit in a mol ratio of 1:4 is prepared by carrying out dehydrating polymerization of a mixture composed of 20 mol % of L-lactic acid and 80 mol % of D-lactic acid, or by carrying out ring-opening copolymerization of a mixture composed of 20 mol % of L-lactic acid 80 mol % of D-lactide. A D-lactic acid/-hydroxycaproic acid copolymer having 30 mol % of hydroxycaproic acid unit can be prepared by carrying out dehydration polycondensation of a mixture composed of 70 mol % of D-lactic acid and 30 mol % of hydroxycaproic acid or by carrying out ring-opening copolymerization of a mixture composed of 70 mol % of D-lactic and 30 mol % of ε-caprolactone.

In the above process (1), filaments composed of the lactic acid-based polymer used for the primary web is preferably stretched and heat treated. Thereby, the strength of the non-woven fabric increases, and hence, shrinking and wrinkles do not easily form.

In the above process (2), filaments composed of the lactic acid-based polymer used for the primary web are preferably stretched and heat treated before mixing with filaments composed of the low temperature thermoplastic lactic acid-based polymer. Thereby, the low temperature thermoplastic lactic acid-based polymer filament alone can be molten in a compression temperature range of from room temperature to 70° C. in hot-pressing a web mixture.

In any of the above processes (1) and (2), a low compression temperature decreases fusion bonding ability between the filaments and a high compression temperature leads to make a rigid sheet. Thus flexible non-woven fabric having good drape is difficult to obtain. In view of these circumstances, the compression temperature is preferably in the above range. Compression pressure is preferably in the range of 1.1~200 kg/cm² in any of the above processes.

The heat compression temperature can be reduced by incorporation of the web of filaments composed of the low temperature thermoplastic lactic acid-based polymer. The web of filaments of low temperature thermoplastic lactic acid-based polymer alone can be fused without melting the primary web and thus there is an advantage that the non-woven fabric obtained is very flexible and has good drape.

The filament of the low temperature thermoplastic lactic acid-based polymer can be spun and converted to web by the same process as the preparation of the above primary web. When too much amount of the web of filaments of the low temperature thermoplastic lactic acid-based polymer is added, the resulting non woven fabric becomes rigid and the strength of the fabric tends to decrease. In view of these circumstances, the amount of the filaments of the low temperature thermoplastic lactic-acid based polymer is preferably in the range of 10~60 wt %, more preferably 20~40 wt % for the total amount of the overall filaments.

In the above process (2), the non-woven fabric can be prepared by mixing webs as shown above, or the non-woven fabric can be prepared by mixing the filaments used for the primary web with the filaments composed of the low temperature lactic acid based polymer, forming webs from the filaments and bonding the constituent filaments.

The lactic acid-based polymer of the above composition from which filaments are obtained can be plasticized with ease by plasticizers. Consequently, plasticizers are preferably added to the lactic acid-based polymer in order to obtain non-woven fabrics having further improved drape and flexibility. Plasticizers which can be used include, for example, di-n-octyl phthalate, di-2-ethyl-hexyl phthalate, dibenzyl phthalate, diisodecyl phthalate, ditridecyl phthalate, diundecyl phthalate, diisooctyl phthalate and other phthalate derivatives; di-n-butyl adipate, dioctyl adipate and other adipate derivatives; di-n-maleate and other maleate derivatives; tri-n-butyl citrate and other citrate derivatives; monobutyl iracohere and other itaconate derivatives; butyl oleate and other oleate derivatives; glycerol monoricinoleate and other ricinoleate derivatives; tricresyl phosphate, trixylenyl phosphate and other phosphate derivatives; glycerol triacetate (triacetin) and other acetate derivatives; lactic acid oligomers having a polymerization degree of 2~10; and polyethylene adipate, polyacrylate and other polymer plasticizers. Preferred plasticizers are triacetin and lactic acid oligomers having a polymerization degree of 2~10. Amount of these plasticizers is preferably 1~35 wt %, more preferably 5~15 wt % based on the amount of the lactic acid-based polymer.

According to the information of the present inventors, the lactic acid based polymer leads to evidently faster strength reduction in outdoor use as compared with uses in a house, dark place or living body, and embrittlement, rupture and other phenomena develop earlier than expected. In order to inhibit these unfavorable phenomena, ultraviolet absorbers and light stabilizers are preferably added to the lactic acid-based polymer which is a principal component of the fundamental filament used of the degradable non-woven fabric of the invention.

Ultraviolet absorbers absorb ultraviolet rays of 250~380 nm wave length which has destructively high energy and reradiate after shifting the rays to a non-destructive wave length. Light stabilizers do not always absorb ultraviolet rays and inhibit light decomposition of a material through some mechanism such as non-radical decomposition of hydroperoxide, a photo-deterioration initiator, or capturing and removal of a radical generated by photo-decomposition. In some cases, ultraviolet absorbers cannot be evidently distinguished from light absorbers.

Exemplary ultraviolet absorbers and light stabilizers which can be used in the invention include phenyl salicylate, p-tert-butylphenyl salicylate and other salicylate derivatives; 2,4-dihydroxybenzophenone, 2-hydroxy-4-methoxybenzophenone, 2,2'-dihydroxy-4-methoxybenzophenone and other benzophenone derivatives; 2-(2'-hydroxy-5'-methylphenyl) benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy5'-tert-octylphenyl)-benzotriazole and other benzotriazole derivatives; organic nickel light stabilizers, organic and inorganic barium, sodium or phosphorus complexes, semicarbazone light stabilizers and zinc oxide base ultraviolet stabilizers known as trade mark SANSHADE.

Synergistic stabilizers which can be used in the invention include, for example, bis(2,2,6,6-tetramethyl-4-piperidyl)sebacate, bis(1,2,2,6,6-pentamethyl-4'-piperidyl)sebacate, dimethyl-1-(2-hydroxyethyl)-4- hydroxy-2,2,6,6-tetramethylpiperidine succinate polycondensate, poly E6-(1,1,3,3-tetramethylbutyl)imino-1,3,5-triazine2,4-di-yl][(2,2,6,6-tetramethyl-4-piperidyl)imino]hexamethylene[(2,2,6, 6-tetramethyl-4-piperidyl)imino], condensation product of butanetetracarboxylic acid and 1,2,2,6,6-pentamethyl-4-piperidinol and tridecyl alcohol, condensation product of 1,2,3,4-butanetetracarboxylic acid and 2,2,6,6-tetramethyl-4-piperidinol and tridecyl alcohol, condensation product of 1,2,3,4-butanetetracarboxylic acid and 2,2,6,6-tetramethyl-4-piperidinol and $\beta$, $\beta$, $\beta'$, $\beta'$- tetramethyl-3,9-[2,4,8,10-tetraoxaspiro(5,5)undecane]diethanol, 1,2,2,6,6-pentamethyl-4-piperidyl methacrylate, 2,2,6,6-tetramethyl-4-piperidyl methacrylate and other hindered amines.

When the amounts of ultraviolet absorbers and/or light stabilizers used in the invention are reduced, the effect for inhibiting deterioration of the non-woven fabric is decreased in outdoor use. On the other hand, increased amounts of these additives are liable to impair essential characteristics of the lactic acid-based polymer. In view of these circumstances, the amounts of ultraviolet absorbers and/or light stabilizers are preferably 0.001~5 wt %, more preferably 0.01~2 wt % based on the amount of the lactic acid-based polymer.

Mixing of the ultraviolet absorbers and/or light stabilizers with the lactic acid-based polymer is carried out by dissolving the lactic acid-based polymer in a solvent such as chloroform, methylene chloride, benzene, toluene, xylene, dimethyl formamide, dimethyl sulfoxide and dimethylimidazolidinone or by heat melting the lactic acid-based polymer at 100°~280° C. and mixing the polymer with a prescribed amounts of the ultraviolet absorbers and/or light stabilizers.

The filament composed of the lactic acid-based polymer used in the invention can be prepared from the lactic acid-based polymer alone, a composition obtained by blending the lactic acid-based polymer with plasticizers, ultraviolet absorbers and light stabilizers, and additionally from a composition obtained by blending the lactic acid-based polymer with heat stabilizers, lubricants and antioxidants, when desired.

EXAMPLE

The invention will hereinafter be illustrated further in detail by way of examples. The ratio of the L-lactic acid unit to the D-lactic acid unit in polylactic acid and the ratio of the lactic acid unit to other hydroxycarboxylic acid units are determined by the following method.

Method for Measuring L-lactic Acid/D-lactic Acid Ratio

The polymer was hydrolyzed by maintaining in a 5 N aqueous sodium hydroxide solution at 60° C. for 10 hours. L-lactic acid in the resulting solution was subjected to the action of L-lactic acid hydrogenase and nicotinamide adenine dinucleotide (hereinafter simply referred to as NAD). NADH which is a reduced form of NAD generated with oxidation of lactic acid to pyruvic acid. The amount of L-lactic acid was determined by an absorbance analysis of NADH. The amount of D-lactic acid was similarly determined by action of D-lactic acid dehydrogenase and NAD. The ratio of L-lactic acid to D-lactic acid was calculated from these amounts. Additionally, it was confirmed that lactic acid did not cause racemization by maintaining L-lactic acid itself in a 5 N aqueous sodium hydroxide solution for 10 hours.

Method for Measuring Lactic Acid/Carboxy Acids Ratio

The copolymer was dissolved in chloroform deuteride and a nuclear magnetic resonance spectrum was measured. The ratio was determined by the ratio of intensity due to the structure of both units.

Preparation Examples of Lactic Acid Based Polymer

Preparation Example 1

To a glass reaction vessel having a silane-treated surface, L-lactide, lauryl alcohol as a molecular weight regulating agent and stannous octoate as a catalyst were individually charged in amounts illustrated in Table 1 and dried for 24 hours by deaerating the vessel under reduced pressure. The reaction vessel was sealed under reduced pressure and polymerization was carried out for a prescribed time by heating to the temperature illustrated in Table 1. After finishing the reaction, the reaction product was dissolved in 20 times by weight of chloroform, and successively the resulting chloroform solution was poured into 5 times by weight of the chloroform of hexane.

Precipitated polymer was filtered and dried to obtain polylactic acid P-1. Molecular weight of P-1 was measured by gel permeation chromatography using chloroform as a solvent (hereinafter referred to as GPC) and calculated by using polystyrene as reference.

Melting point and glass transition temperature (Tg) of P-1 were measured by using a differential scanning calorimeter (DSC). Polymerization conditions of P-1, molecular weight of P-1, ratio of the L-lactic acid unit to the D-lactic acid unit (hereinafter referred to as copolymer composition), melting point and glass transition temperature (Tg) are illustrated in Table 1.

Preparation Examples 2~7

The same procedures as described in Preparation Example 1 were carried out except that L-lactide, DL-lactide having a D-isomer/L-isomer mol ratio of 50/50, and/or caprolactone, lauryl alcohol as a molecular weight regulating agent and stannous octoate as a catalyst were charged respectively in amounts illustrated in Table 1 and reacted at polymerization temperature illustrated in Table 1 for a time illustrated in Table 1. Thus, lactic acid-based polymers P-2~P-7 were obtained. Molecular weight, proportion of L-lactic acid unit, D-lactic acid unit and other hydroxycarboxylic acid units (hereinafter referred to as copolymer composition), melting point and Tg were measured on P-2~P-7 by the same method as Preparation Example 1. Polymerization conditions and measured results are illustrated in Table 1.

TABLE I

| | Preparation Example | | | | | | |
|---|---|---|---|---|---|---|---|
| | 1 | 2 | 3 | 4 | 5 | 6 | 7 |
| Polymer | P-1 | P-2 | P-3 | P-4 | P-5 | P-6 | P-7 |
| L-lactide (wt part) | 100 | 70 | 90 | 100 | — | 50 | 10 |
| DL-lactide (wt part) | — | 30 | — | — | 100 | — | — |
| Caprolactone (wt part) | — | — | 10 | — | — | 50 | 90 |
| Catalyst (wt %) | 0.010 | 0.015 | 0.015 | 0.015 | 0.015 | 0.003 | 0.003 |

TABLE I-continued

| | Preparation Example | | | | | | |
|---|---|---|---|---|---|---|---|
| | 1 | 2 | 3 | 4 | 5 | 6 | 7 |
| Molecular weight regulator (wt %) | 0.6 | — | — | — | 0.3 | — | — |
| Polymerization temperature (°C.) | 190 | 120 | 130 | 110 | 130 | 110 | 110 |
| Polymerization time (hr) | 4 | 120 | 80 | 160 | 80 | 300 | 60 |
| Molecular weight (× 1000) | 41 | 410 | 332 | 376 | 295 | 455 | 260 |
| Copolymer composition (mol %) | | | | | | | |
| L-lactic acid unit | 100 | 85 | 89 | 100 | 50 | 45 | 9 |
| D-lactic acid unit | 0 | 15 | 0 | 0 | 50 | 0 | 0 |
| Hydroxycaproic acid unit | 0 | 0 | 11 | 0 | 0 | 55 | 91 |
| Tg (°C.) | 59 | 77 | 45 | *1 | 59 | −15 | −52 |
| Melting point (°C.) | 179 | 120 | 167 | 189 | *1 | 105 | 68 |

(Note) * 1: undetected by DSC

Preparation Example 8

To a reactor, L-lactic acid was charged in an amount illustrated in Table 2. and water distilled out by heating with stirring at 150° C. for 3 hours under reduced pressure of 50 mmHg. Successively 0.06 part by weight of tin powder was added and further heated with stirring at 150° C. for 2 hours under reduced pressure of 35 mmHg to obtain an oligomer. To the oligomer, 0.29 part by weight of tin powder and 211 parts by weight diphenyl ether were added and an azeotropic dehydration reaction was carried out at 150° C. under reduced pressure of 35mm Hg. Distilled water was separated from the solvent in a water separator and the solvent alone was returned to the reactor. After two hours, the organic solvent was changed to return to the reactor after passing through a column packed with 46 parts by weight of molecular sieve 3A and the reaction was further: continued at 150° C. for 40 hours under reduced pressure of 35 mmHg to,obtain a polylactic acid solution.

To the solution, 440 parts by weight of dried diphenyl ether were added and cooled to 40° C. Precipitated crystals were filtered, washed three times with 100 parts by weight of n-hexane and dried at 60° C. under 50 mmHg. The powder thus obtained was mixed with 120 parts by weight of a 0.5 N aqueous hydrochloric acid solution and 120 parts by weight of ethanol. The mixture was stirred for an hour at 35° C. and dried at 60° C. under reduced pressure of 50 mmHg to obtain a lactic acid-based polymer P-8. Molecular weight, copolymer composition, melting point and Tg of the lactic acid-based polymer thus obtained were measured by the same method as Preparation Example 1. Results are illustrated in Table 2. Although the raw material used was L-lactic acid alone, the polymer thus obtained contained 1% of D-lactic acid unit.

Preparation Examples 9~10

Lactic acid-based polymers P-9 and P-10 were prepared by carrying out the same procedures as described in Preparation Example 8 except that L-lactic acid, DL-lactic acid having a D-isomer/L-isomer mol ratio ratio of 50/50 and/or glycolic acid were used as illustrated in Table 2. Molecular weight, copolymer composition, melting point and Tg were measured by the same method as Preparation Example 1. Results are illustrated in Table 2.

TABLE 2

| | Preparation Example | | |
|---|---|---|---|
| | 8 | 9 | 10 |
| Lactic acid based polymer | P-8 | P-9 | P-10 |
| L-lactic acid (wt part) | 100 | 70 | 90 |

TABLE 2-continued

| | Preparation Example | | |
|---|---|---|---|
| | 8 | 9 | 10 |
| DL-lactic acid (wt part) | — | 30 | — |
| Glycolic acid (wt part) | — | — | 10 |
| Molecular weight (× 1000) | 110 | 113 | 108 |
| Copolymer composition (mol %) | | | |
| L-lactic acid unit | 99 | 84 | 87 |
| D-lactic acid unit | 1 | 16 | 0 |
| Glycolic acid unit | 0 | 0 | 13 |
| Tg (°C.) | 50 | 49 | 49 |
| Melting point (°C.) | 165 | 110 | 139 |

Preparation Example of Plasticizer

Preparation Example 11

To a reaction vessel, 1.8 kg of L-lactide and 1.0 kg of an aqueous lactic acid solution having a concentration of 87% by weight were charged and heated at 100° c for 2 hours. The reaction mixture was cooled to room temperature. A viscous transparent liquid was obtained. The oligomer thus obtained was dissolved in chloroform and molecular weight distribution was measured by gel permeation chromatography. The reaction product obtained contained lactic acid and oligomer and had an average polymerization degree of 2.8, which is hereinafter referred to as LA-oligomer.

Examples 1~7 and Comparative Examples 1~6

Lactic acid-based polymers P-1~P-6 and P-8~P-10 which were obtained in Preparation Examples 1~6 and 8~10 were respectively blended with marketed triacetin or LA-oligomer obtained in Preparation Example 11 as a plasticizer, and 2-(2′-hydroxy-5′-methylphenyl) benzotriazole as an ultraviolet absorber in an amount illustrated in Table 3 and Table 4. Each composition thus obtained was individually spun by extruding with a screw type small extruder under conditions illustrated in Table 3 and Table 4.

In Comparative Example 1, spinning was tried under the same conditions as Example 1. However, the polymer was packed in the extruder and spinning was impossible.

The lactic acid-based polymer filaments thus obtained were respectively collected on a screen to form a random web and compressed with hot rolls under the conditions illustrated in Table 3 and Table 4 to obtain a degradable non-woven fabric.

The degradable non-woven fabric thus obtained has residual appearance of filaments and maintains a cloth like shape which evidently differs from a film obtained by melt processing. The non-woven fabric was neither split nor got out of shape even though the surface and the back of the fabric were individually grasped by fingers of both hands and pulled to the direction perpendicular to the fabric surface.

The non-woven fabrics having dimensions of 10×10 cm which were obtained in Examples 1~2 and 5~7 and Comparative Examples 2~3 and 5~6 were respectively inserted between two iron plates having a thickness of 5 mm and subjected to heat treatment for 10 minutes at the temperature illustrated in Table 3. As a result, the non-woven fabric obtained in the examples caused no shrinking or deformation. On the other hand, the non-woven fabric obtained in the comparative examples developed shrinking and deformation and also had structural change due to softening and melting.

Non-woven fabrics with and without heat treatment were cut into dimensions of 1×10 cm and measured strengths at break by using a tensile tester with a chuck distance of 4 cm at a pulling rate of 10 cm/min the room temperature.; Rate of strength improvement (%) was calculated by dividing the tensile strength at break of heat treated fabric by the tensile strength at break of untreated fabric. Results obtained are illustrated in Table 3 and Table 4.

Evaluation of Appearance of Non-woven Fabric

The same appearance evaluation as the above was carried out just after production and after allowing to stand outdoors for 1 month. The non-woven fabric which was neither split nor got out of shape when the surface and the back of the fabric were individually grasped by fingers of both hands and pulled to the direction perpendicular to the fabric surface was evaluated as good. Results are illustrated in Table 3 and Table 4.

Evaluation of Degradability of Non-woven Fabric

Non-woven fabric obtained was buried in soil for 18 months. Thereafter the fabric was dissolved in chloroform and the molecular weight was measured by GPC method using polystyrene as reference. Molecular weights before and after burying were measured and a molecular weight retention rate was calculated by the following equation to evaluate degradability.

$$DW\ (\%) = 100\ W_1/W_0$$

where
- DW: molecular weight retention rate (%)
- $W_0$: molecular weight before burying
- $W_1$: molecular weight after burying for 18 months in soil.

Results are illustrated in Table 3.

Mark * in Table 3 indicates that molecular weight measurement was difficult because of violent degradation of the fabric.

TABLE 3

| | Example | | | | | | |
|---|---|---|---|---|---|---|---|
| | 1 | 2 | 3 | 4 | 5 | 6 | 7 |
| Lactic acid based polymer | P-2 | P-3 | P-2 | P-3 | P-8 | P-9 | P-10 |
| Plasticizer | | | | | | | |
| compound | — | — | triacetin | LA-oligomer | — | — | — |
| Amount (wt %) | — | — | 5 | 8 | — | — | — |
| UV absorber (wt %) | 0.15 | 0.10 | 0.15 | 0.10 | 0.20 | 0.15 | 0.10 |
| Spinning temperature (°C.) | 160 | 180 | 120 | 160 | 210 | 140 | 180 |
| Processability | good | good | good | good | good | good | good |
| Hot roll temperature (°C.) | 80 | 120 | 75 | 120 | 80 | 80 | 80 |
| Hot roll pressure (kg/cm²) | 10 | 10 | 10 | 10 | 10 | 10 | 10 |
| Appearance of non-woven fabric | | | | | | | |
| Just produced | good | good | good | good | good | good | good |
| After 1 month outdoors | good | good | good | good | good | good | good |
| Heat treatment | | | | | | | |
| Temp. (°C.) | 100 | 90 | — | — | 100 | 100 | 90 |
| Deformation & shrinking | almost no | almost no | — | — | almost no | almost no | almost no |
| Strength increase (%) | 63 | 52 | — | — | 76 | 54 | 39 |
| Molecular weight retention rate (%) | 56 | 35 | 22 | 79 | 51 | 29 | |

*Molecular weight measurement was difficult due to violent degradation.

TABLE 4

| | Comparative Example | | | | | |
|---|---|---|---|---|---|---|
| | 1 | 2 | 3 | 4 | 5 | 6 |
| Lactic acid based polymer | P-1 | P-1 | P-4 | P-1 | P-5 | P-6 |
| Plasticizer | | | | | | |
| compound | — | — | — | triacetin | — | — |
| Amount (wt %) | — | — | — | 5 | — | — |
| UV absorber (wt %) | 0.15 | 0.15 | 0.15 | 0.15 | 0.10 | 0.10 |
| Spinning temperature (°C.) | 160 | 220 | 220 | 200 | 160 | 160 |
| Processability | extrusion impossible *1 | good | extrusion unstable | good | good | good |
| Hot roll temperature (°C.) | — | 120 | 120 | 120 | 80 | 80 |
| Hot roll pressure (kg/cm²) | — | 10 | 10 | 10 | 10 | 10 |
| Appearance of non-woven | | | | | | |

TABLE 4-continued

| | Comparative Example | | | | | |
|---|---|---|---|---|---|---|
| | 1 | 2 | 3 | 4 | 5 | 6 |
| fabric | | | | | | |
| Just produced | — | good | bad | bad and sticky | good | good |
| After 1 month outdoors | — | large deformation | bad | very sticky | deformation by softening | deformation by softening |
| Heat treatment | | | | | | |
| Temp, (°C.) | — | 90 | 100 | — | 100 | 80 |
| Deformation & shrinking | — | large | large | — | *2 | *2 |
| Strength increase (%) | — | *3 | *3 | — | 8 | 0 |

(Note)
*1 Extruder was packed.
*2 Structure of fabric was changed due to softening aud melting in heat treatment.
*3 Measurement was impossible doe to very large deformation or shrinking.

Spinning Examples 1~6

Lactic acid-based polymers P-2 and P-5~P-9 which were obtained in Preparation Example 2 and 5~9 were individually blended with 2-(2'-hydroxy-5'-methylphenyl) benzotriazole as an ultraviolet absorber in an amount illustrated in Table 5. Each mixture was respectively spun by melt extruding through a screw type small extruder under conditions illustrated in Table 5 to obtain lactic acid-based polymer filaments F-1 ~F-6. In Spinning Examples 1~3, delivered filaments were stretched with a continuous stretching machine and heat treated by continuously passing between hot plates at a prescribed temperature. Stretching conditions and heat treating conditions are illustrated in Table 5.

TABLE 5

| | Spinning Example | | | | | |
|---|---|---|---|---|---|---|
| | 1 | 2 | 3 | 4 | 5 | 6 |
| Filament No. | F-1 | F-2 | F-3 | F-4 | F-5 | F-6 |
| Lactic acid based polymer | P-2 | P-8 | P-9 | P-6 | P-5 | P-7 |
| UV absorber (wt %) | 0.1 | 0.1 | 0.1 | 0.1 | 0.1 | 0.1 |
| Spinning temperature (°C.) | 160 | 210 | 140 | 160 | 160 | 140 |
| Stretching temperature (°C.) | 80 | 80 | 80 | — | — | — |
| Stretching ratio (times) | 4 | 4 | 3 | — | — | — |
| Heat treatment temperature (°C.) | 100 | 100 | 90 | — | — | — |

Examples 8~10

Filaments F-1~F-3 which were obtained in Spinning Examples 1~3 using the lactic acid-based polymer were cut into short filaments having a length of about 5 cm. Filaments F-4~F-6 which were obtained in Spinning Examples 4~6 using the low temperature thermoplastic lactic acid-based polymer were cut into short filaments having a length of about 4 cm. One of the filaments of the lactic acid-based polymer was mixed with one of the filaments composed of the low temperature thermoplastic lactic acid-based polymer in a ratio by weight illustrated in Table 6 and stirred to form a random web. The web obtained was successively hot pressed under conditions illustrated in Table 6 to obtain a degradable non-woven fabric.

Properties of the non-woven fabric thus obtained were evaluated by the same method as Example 1. Results are illustrated in Table 6.

TALBE 6

| | | Example | | |
|---|---|---|---|---|
| | | 8 | 9 | 10 |
| Lactic acid-base polymer filament | Filament No. Amount (wt %) | F-1 65 | F-2 72 | F-3 69 |
| Low temperature thermoplastic lactic acid-base polymer filament | Filament No. Amount (wt %) | F-4 35 | F-5 28 | F-6 31 |
| Press temperature (°C.) | | 60 | 65 | 60 |
| Press pressure (kg/cm²) | | 10 | 10 | 10 |
| Appearance of non-woven fabric | Just produced | good | good | good |
| | After 1 month outdoors | good | good | good |
| Molecular weight retention rate (%) | | 33 | 58 | * |

*Molecular weight measurement was difficult due to violent degradation.

Example 11

The lactic acid-based polymer filaments F-2 obtained in Spinning Example 2 were cut into short filaments of about 4 cm in length and stirred to form a random web. The web was thereafter lightly pressed with an embossing roll having a weave pattern like engraving at a roll surface temperature of 100° C. and wound up. The wound up non-woven fabrics were bonded each other by needle punching alternately 6 times on both surface with a needle depth of 11 mm and needle density of 30 P/cm². The degradable non-woven fabric thus obtained had interlocked filaments and good properties. The fabric did not develop deformation such as shrinking and wrinkles even after allowing to stand outdoors for a month. The non-woven fabric was effectively degraded after burying in soil for 18 months. Molecular weight retention rate was 72%.

Comparative Example 7

A marketed needle punch type non-woven fabric TAFNEL PA-4021 (Trade Mark of Mitsui Petro Chemical Industry Co.) was buried in soil for 18 months and thereafter dissolved in dichlorobenzene and measured a molecular weight retention rate by the same method as Example 1. The molecular weight retention rate was 98% and almost no degradation was found.

The invention may be practiced or embodied in still other ways without departing from the spirit or essential character thereof.

However, these examples are not intended to limit the scope of the present invention. The invention maybe practiced or embodied in still other ways without departing from the spirit or essential character thereof.

What is claimed is:

1. A degradable non-woven fabric obtained from a web of a mixture of filaments composed of a lactic acid-based polymer (A) and filaments Composed of a thermoplastic lactic acid-based polymer (B), wherein the polymer (A) comprises one or more lactic acid-based polymers selected from the group consisting of poly(DL-lactic acid) having more than 80 mol % of L-lactic acid units, poly(DL-lactic acid) having more than 80 mol % of D-lactic acid units, L-lactic acid/hydroxycarboxylic acid copolymer having 70 mol % or more of L-lactic acid units, and D-lactic acid/hydroxycarboxylic acid copolymer having 70 mol % or more of D-lactic acid units, and the thermoplastic lactic acid-based polymer (B) comprises one or more lactic acid-based polymers selected from the group consisting of poly(DL-lactic acid) having from 1:4 to 4:1 in the mol ratio of L-lactic acid units to D-lactic acid units, a DL-lactic acid/hydroxycarboxylic acid copolymer, L-lactic acid/hydroxycarboxylic acid copolymer having 30 mol % or more of hydroxycarboxylic acid units, and D-lactic acid/hydroxycarboxylic acid copolymer having 30 mol % or more of hydroxycarboxylic acid units.

2. A process for preparing a degradable non-woven fabric comprising:

forming a web from a mixture of filaments composed of a lactic acid, based polymer (A) and filaments composed of a thermoplastic lactic acid-based polymer (B), wherein the polymer (A) comprises one or more lactic acid-based polymers selected from the group consisting of poly(DL-lactic acid) having more than 80 mol % of L-lactic acid units, poly(DL-lactic acid) having more than 80 mol % of D-lactic acid units, L-lactic acid/hydroxycarboxylic acid copolymer having 70 mol % or more of L-lactic acid units, and D-lactic acid/hydroxycarboxylic acid copolymer having 70 mol % or more of D-lactic acid units and the thermoplastic lactic acid-based polymer (B) comprises one or more lactic acid-based polymers selected from the group consisting of poly(DL-lactic acid) having from 1:4 to 4:1 in the mol ratio of L-lactic acid units to D-lactic acid units, a DL-lactic acid/hydroxycarboxylic acid copolymer, L-lactic acid/hydroxycarboxylic acid copolymer having 30 tool % or more of hydroxycarboxylic acid units, and D-lactic acid/hydroxycarboxylic acid copolymer having 30 mol % or more of hydroxycarboxylic acid units, and forming the non-woven fabric from the web.

3. A degradable non-woven fabric of claim 1 wherein, in the polymer A, the L-lactic acid/hydroxycarboxylic acid copolymer is one or more lactic acid-based polymers selected from the group consisting of an L-lactic acid/glycolic acid copolymer, L-lactic acid/hydroxycaproic acid copolymer and a mixture of these copolymers, and the D-lactic acid/hydroxycarboxylic acid copolymer is one or more lactic acid-based polymers selected from the group consisting of a D-lactic acid/glycolic acid copolymer, D-lactic acid/hydroxycaproic acid copolymer and a mixture of these copolymers.

4. A degradable non-woven fabric of claim 1 wherein, in the polymer B, the DL-lactic acid/hydroxycarboxylic acid copolymer is one or more lactic acid-based polymers selected from the group consisting of a DL-lactic acid/glycolic acid copolymer, DL-lactic acid/hydroxycaproic acid copolymer, and a mixture of these copolymers, the L-lactic acid/hydroxycarboxylic acid copolymer is one or more lactic acid-based polymers selected from the group consisting of a L-lactic acid/glycolic acid copolymer, L-lactic acid/hydroxycaproic acid copolymer and a mixture of these copolymers, and the D-lactic acid/hydroxycarboxylic acid copolymer is one or more lactic acid-based polymers selected from the group consisting of a D-lactic acid/glycolic acid copolymer, D-lactic acid/hydroxycaproic acid copolymer and a mixture of these copolymers.

5. A degradable non-woven fabric of claim 1 wherein the amount of the filament obtained from the polymer B is from 10 to 60 wt % based on for the total amount of filaments.

6. A degradable non-woven fabric of claim 1 wherein the filaments obtained from the polymer A are heated-fused or compressed-bonded by the filaments obtained from the polymer B.

7. A degradable non-woven fabric of claim 6 wherein the heat-fusion carried out by hot-pressing at temperature from room temperature to 70° C. under the pressure of from 1.1 to 200 kg/cm$^2$.

8. A degradable non-woven fabric of claim 1 wherein the lactic acid-based polymer has a weight average molecular weight of from 10,000 to 1,000,000.

9. A degradable non-woven fabric of claim 1 wherein the lactic acid-based polymer is prepared by dehydration polycondensation.

10. A degradable non-woven fabric of claim 1 wherein the filaments obtained from the polymer A comprise one or more additives selected from the group consisting of a plasticizer, ultraviolet absorber and light stabilizer.

11. A degradable non-woven fabric of claim 1 wherein the filaments obtained from the polymer; B comprise one or more additives selected from the group consisting of a plasticizer, ultraviolet absorber and light stabilizer.

12. A preparation process of degradable non-woven fabric of claim 2 wherein, in the polymer A, the L-lactic acid/hydroxycarboxylic acid copolymer is one or more lactic acid-based polymers selected from the group consisting of an L-lactic acid glycolic acid copolymer, L-lactic acid/hydroxycaproic acid copolymer and a mixture of these copolymers, and the D-lactic acid/hydroxycarboxylic acid copolymer is one or more lactic-acid based polymers selected from the group consisting of a D-lactic acid/glycolic acid copolymer, D-lactic acid/hydroxycaproic acid copolymer and a mixture of these copolymers.

13. A preparation process of a degradable non-woven fabric of claim 2 wherein, in the polymer B, the DL-lactic acid/hydroxycarboxylic acid copolymer is one or more lactic acid-based polymers selected from the group consisting of a DL-lactic acid/glycolic acid copolymer, DL-lactic acid/hydroxycaproic acid copolymer and a mixture of these copolymers, the L-lactic acid/hydroxycarboxylic acid copolymer is one or more lactic acid-based polymers selected from the group consisting of an L-lactic acid/glycolic acid copolymer, L-lactic acid/hydroxycaproic acid copolymer and a mixture of these copolymers, and the D-lactic acid/hydroxycarboxylic acid copolymer; is one or more lactic acid-based polymers selected from the group consisting of a D-lactic acid/glycolic acid copolymer, D-lactic acid/hydroxycaproic acid copolymer and a mixture of these copolymers.

14. A preparation process of a degradable non-woven fabric of claim 2 wherein the amount of the filament obtained from the polymer B is from 10 to 60 wt % based on the total amount of filaments.

15. A preparation process of a degradable non-woven fabric of claim 2 wherein the filaments obtained from the polymer A are heat-fused or compressed-bound by the filaments obtained from the polymer B.

16. A preparation process of a degradable non-woven fabric of claim 15 wherein the heat-fusion is carried out by hot-pressing at temperature from room temperature to 70° C. under the pressure of from 1.1 to 200 kg/cm$^2$.

17. A preparation process of a degradable non-woven fabric of claim 2 wherein the lactic acid-based polymer has a weight average molecular weight of from 10,000 to 1,000,000.

18. A preparation process of a degradable non-woven fabric of claim 2 wherein tile lactic acid-based polymer is prepared by dehydration polycondensation.

19. A preparation process of a degradable non-woven fabric of claim 2 wherein the filaments obtained from the polymer A comprise one or more additives selected from the group consisting of a plasticizer, ultraviolet absorber and light stabilizer.

20. A preparation process of a degradable non-woven fabric of claim 2 wherein the filaments obtained from the polymer B comprise one or more additives selected from the group ,consisting of a plasticizer, ultraviolet absorber and light stabilizer.

21. A preparation process of a degradable non-woven fabric of claim 2 wherein the filaments obtained from the polymer A are stretched and heat-treated.

22. A preparation process of a degradable non-woven fabric of claim 2 wherein the filaments obtained from the polymer A are stretched and heat-treated and thereafter mixed with the filaments obtained from the polymer B.

* * * * *

UNITED STATES PATENT AND TRADEMARK OFFICE
CERTIFICATE OF CORRECTION

PATENT NO. : 5,437,918

DATED : August 1, 1995

INVENTOR(S) : Taniguchi et al

It is certified that error appears in the above-indentified patent and that said Letters Patent is hereby corrected as shown below:

In column 19, (claim 1), line 3, amend "Composed" to --composed--.

In column 19, (claim 2), line 28, amend "acid, based" to --acid-based--;

acid/hydroxycarboxylic acid copolymer having 70 mol % or more of";

line 39, after "units" insert a comma --,--;

line 46, amend "tool" to --mol--.

UNITED STATES PATENT AND TRADEMARK OFFICE
CERTIFICATE OF CORRECTION

PATENT NO. : 5,437,918

DATED : August 1, 1995

INVENTOR(S) : Taniguchi et al

It is certified that error appears in the above-indentified patent and that said Letters Patent is hereby corrected as shown below:

In column 20, (claim 5), line 13, delete "for".

In column 20, (claim 7), line 20, after "fusion" insert --is--.

In column 20, (claim 11), line 36, after "polymer" delete ";".

In column 20, (claim 13), line 64, after "copolymer" delete ";".

In column 21, (claim 18), line 18, amend "tile" to --the--;

In column 22, (claim 20), line 9, amend "group ,consisting" to

-- group consisting--.

Signed and Sealed this

Ninth Day of April, 1996

BRUCE LEHMAN

*Attest:*

*Attesting Officer*         *Commissioner of Patents and Trademarks*

UNITED STATES PATENT AND TRADEMARK OFFICE
CERTIFICATE OF CORRECTION

PATENT NO. : 5,437,918

DATED : August 1, 1995

INVENTOR(S) : Taniguchi et al

It is certified that error appears in the above-indentified patent and that said Letters Patent is hereby corrected as shown below:

In column 19, (claim 1), line 3, amend "Composed" to --composed--.

In column 19, (claim 2), line 28, amend "acid, based" to --acid-based--;

line 39, after "units" insert a comma --,--;

line 46, amend "tool" to --mol--.

UNITED STATES PATENT AND TRADEMARK OFFICE
CERTIFICATE OF CORRECTION

PATENT NO. : 5,437,918

DATED : August 1, 1995

INVENTOR(S) : Taniguchi et al

It is certified that error appears in the above-indentified patent and that said Letters Patent is hereby corrected as shown below:

In column 20, (claim 5), line 13, delete "for".

In column 20, (claim 7), line 20, after "fusion" insert --is--.

In column 20, (claim 11), line 36, after "polymer" delete ";".

In column 20, (claim 13), line 64, after "copolymer" delete ";".

In column 21, (claim 18), line 18, amend "tile" to --the--;

In column 22, (claim 20), line 9, amend "group ,consisting" to

-- group consisting--.

This certiicate supersedes Certificate of Correction issued April 9, 1996.

Signed and Sealed this

Thirty-first Day of March, 1998

Attest:

BRUCE LEHMAN

*Attesting Officer*     *Commissioner of Patents and Trademarks*